United States Patent
Hamada et al.

(10) Patent No.: US 6,442,478 B2
(45) Date of Patent: Aug. 27, 2002

(54) NAVIGATION DEVICE

(75) Inventors: Hiroyuki Hamada, Yawata; Kiyomi Sakamoto, Ikoma; Yoshiki Ueyama, Sakai, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/760,821

(22) Filed: Jan. 17, 2001

(30) Foreign Application Priority Data

Jan. 19, 2000 (JP) ........................................ 2000-010930

(51) Int. Cl.⁷ ........................... G01C 21/32; G06F 17/30
(52) U.S. Cl. ........................ 701/209; 701/210; 701/211; 340/990; 340/995
(58) Field of Search ................................. 701/209, 210, 701/211, 201; 340/990, 995, 989

(56) References Cited

U.S. PATENT DOCUMENTS 6,041,281 A * 3/2000 Nimura et al. .............. 701/211
6,064,941 A * 5/2000 Nimura et al. .............. 701/210
6,078,865 A * 6/2000 Koyanagi .................... 701/211
6,202,022 B1 * 3/2001 Ando ........................... 701/200
6,230,098 B1 * 5/2001 Ando et al. .................. 701/208
6,282,493 B1 * 8/2001 Kitagawa et al. ............ 701/211

FOREIGN PATENT DOCUMENTS

JP          2000-207689         7/2000

* cited by examiner

Primary Examiner—Tan Nguyen
(74) Attorney, Agent, or Firm—Wenderoth, Lind & Ponack, L.L.P.

(57) ABSTRACT

In order to implement a navigation device in which landmarks are much less monotonous, and the applicability thereof is wider, the navigation device of the present invention operates as follows. A landmark is displayed in either normal display (still) and emphatic display (animated) by referring to landmark information. Specifically, referring to for normal display is shape information and positional information in the landmark information, and for emphatic display, an emphatic display execution file therein is referred to. For emphatic display, a group of instruction described in the emphatic display execution file are interpreted and executed so that the landmark is animated.

7 Claims, 4 Drawing Sheets

NAVIGATION DEVICE

BACKGROUND OF THE INVENTION

1. Field of the Invention

The present invention relates to navigation devices and, more specifically, to a navigation device which displays landmarks together with a guidance route.

2. Description of the Background Art

A conventional type of navigation device typically equipped in a vehicle generally guides a driver by indicating him/her, by name, at which intersection the driver is supposed to turn, or the distance to the intersection. The issue here is that the driver may not easily find the indicated intersection on a display when his/her vehicle is far therefrom. Also, if guided as "XX meters to the intersection", the driver may not intuitively grasp the actual distance to the intersection. Therefore, the driver may find it difficult to estimate in advance the rough location of the intersection. As such, guidance by the conventional navigation device is often difficult to follow.

To get around such a problem, the recent type of navigation device displays various facilities located around the intersection, and makes use of those as landmarks when guiding vehicles. For example, guidance is made as "take a right turn at the post office, go straight until you locate the gas station, and then take a left turn there".

Generally, those landmarks used in such conventional navigation device are in the form of plain, still image elements. Thus those landmarks look monotonous and applicability thereof is quite limited.

As to those landmarks, information thereabout is required to be accurate in route guidance, and is usually stored in media such as CDs and DVDs. The issue here is that those landmarks do not remain the same, for example, a gas station may move, be closed, or any other new gas station may be opened. In order to keep up with such changes, the medium having landmark information stored therein needs to be frequently replaced. However, such frequent replacement is practically difficult in terms of the users' financial standing, and consequently the reliability of the landmark information in the conventional navigation device is low.

SUMMARY OF THE INVENTION

Therefore, an object of the present invention is to provide a navigation device in which landmarks are much less monotonous, and the applicability thereof is thus wider.

Another object of the present invention is to provide a navigation device which can easily update landmark information to be the latest, and accordingly guidance made therein is always accurate.

The present invention has the following features to attain the objects above.

A first aspect of the present invention is directed to a navigation device displaying landmarks together with a guidance route on a map, the device comprising:
  a cartographic data storage part for storing cartographic data;
  a landmark information storage part for storing landmark information;
  an output part for at least outputting, for display, information needed for guidance;
  an input part for receiving positional information needed at least for route search;
  a route search part for searching for the guidance route on the cartographic data in response to the positional information from the input part;
  a display state determination part for determining, as to each of the landmarks on the guidance route found by the route search part, between normal display and emphatic display; and
  a display control part for bringing the output part to display the map based on the cartographic data read from the cartographic data storage part, to display the found guidance route on the displayed map, and to appropriately place and display the landmarks on the displayed map, wherein
    the display control part determines between normal display and emphatic display for each of the landmarks depending on a determination made by the display state determination part.

As described above, in the first aspect, landmarks on a guidance route are determined by display status between normal display and emphatic display before the landmarks are displayed. Accordingly, the landmarks look much less monotonous, and the applicability thereof is extended.

According to a second aspect, further to the first aspect,
  the landmark information includes display information about the landmarks for emphatic display in the format of an execution file, and
  the display control part interprets and executes the execution file to bring the output part to emphatically display the landmarks.

As described above, in the second aspect, the output part follows thus interpreted and executed instructions described in an execution file of the landmark information to emphatically display landmarks. Therefore, by rewriting those instructions in the execution file, the landmarks can be emphatically displayed in various manners easily.

According to a third aspect, further to the second aspect,
  in the execution file included in the landmark information, a group of instructions are described to animate the landmarks.

As described above, in the third aspect, the landmarks are animated according to the instructions described in the execution file.

According to a fourth aspect, further to the first aspect,
  the landmark information includes attribute information which defines the landmarks by attribute, and
  the display state determination part comprises:
    a real-time information acquisition part for acquiring real-time information as a variable parameter; and
    a determination part for determining between normal display and emphatic display based on the real-time information acquired by the real-time information acquisition part and the attribute information stored in the landmark information.

As described above, in the fourth aspect, the landmarks are defined by attribute and real-time information is referred to before determining between normal display and emphatic display. Therefore, the landmarks can be displayed in various manners depending on circumstances.

According to a fifth aspect, further to the fourth aspect,
  the attribute information includes type information indicating each of the landmarks by type, and
  the determination part determines between normal display and emphatic display based on real-time information acquired by the real-time information acquisition part and the type information in the attribute information.

As described above, in the fifth aspect, the landmark type is the attribute used as the determination factor for emphatic display.

According to a sixth aspect, further to the first aspect, the navigation device further comprises:

a landmark information acquisition part for acquiring a latest landmark information coming from outside through communications; and an update part for bringing the landmark information storage part to store the landmark information provided by the landmark information acquisition part as the latest landmark information.

As described above, in the sixth aspect, the landmark information storage part stores the landmark information provided by the landmark information acquisition part as to be the latest.

A seventh aspect of the present invention is directed to a navigation device displaying landmarks together with a guidance route on a map, the device comprising:

a cartographic data storage part for storing cartographic data;

a landmark information storage part for storing landmark information;

an output part for at least outputting, for display, information needed for guidance;

an input part for receiving positional information needed at least for route search;

a route search part for searching for the guidance route on the cartographic data in response to the positional information from the input part;

a display control part for bringing the output part to display the map based on the cartographic data read from the cartographic data storage part, to display the found guidance route on the displayed map, and to appropriately place and display the landmarks on the displayed map;

a landmark information acquisition part for acquiring a latest landmark information coming from outside through communications; and an update part for bringing the landmark information storage part to store the landmark information provided by the landmark information acquisition part as the latest.

These and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
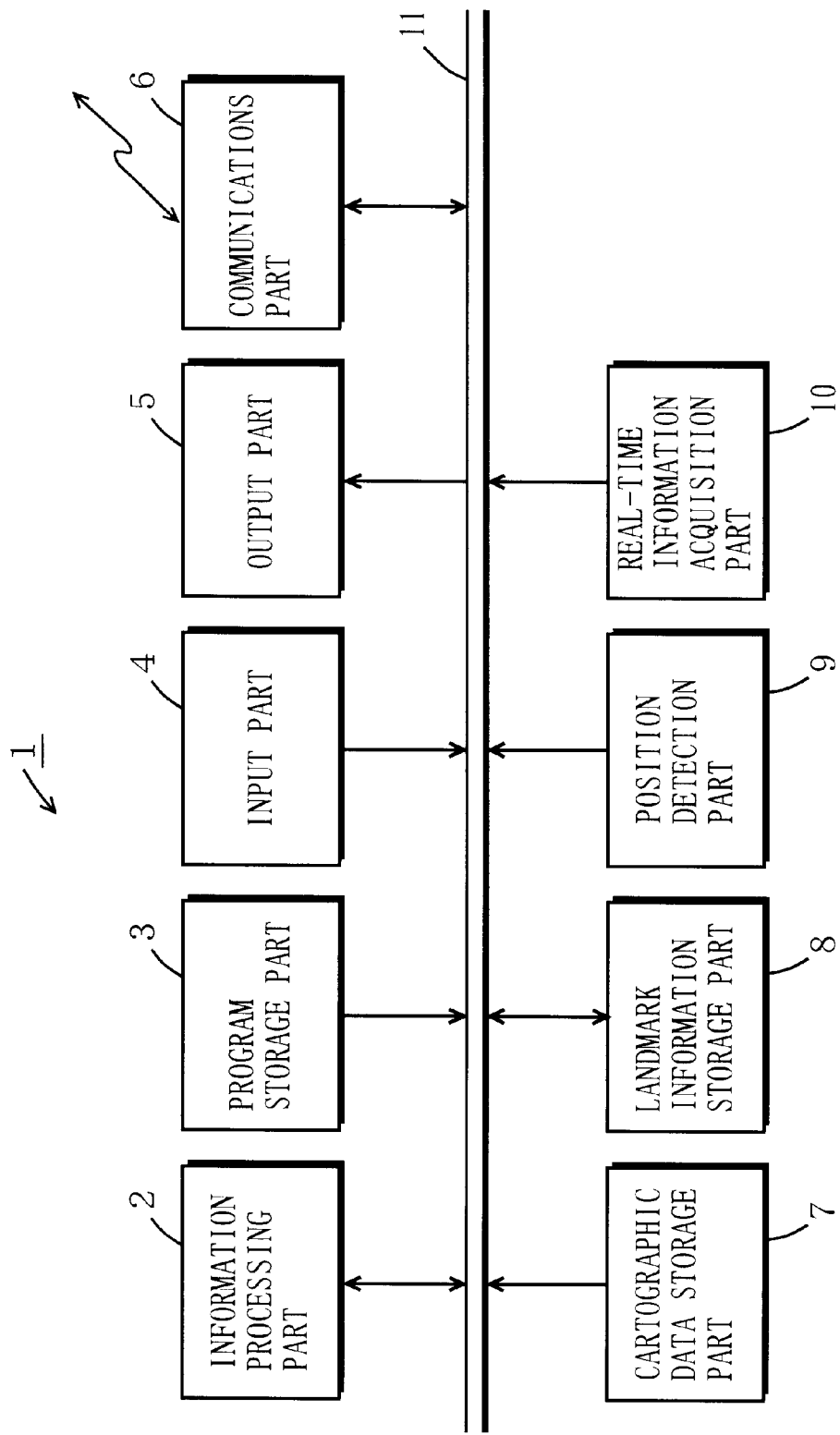
FIG. 1 is a block diagram showing the structure of a navigation device according to one embodiment of the present invention.

FIG. 1 is a block diagram showing the structure of a navigation device according to one embodiment of the present invention. In FIG. 1, a navigation device 1 includes an information processing part 2, a program storage part 3, an input part 4, an output part 5, a communications part 6, a cartographic data storage part 7, a landmark information storage part 8, a position detection part 9, and a real-time information acquisition part 10. Those components are interconnected with one another via a system bus 11. Here, the navigation device 1 is presumably equipped in a vehicle.

The information processing part 2 is exemplarily implemented by a CPU, which operates in accordance with program information stored in the program storage part 3. The information processing part 2 performs various processing for navigation, for example, searching for a guidance route, updating landmark information, determining the display state of landmarks, and guiding the vehicle. Here, the program storage part 3 may be so structured as to unalterably store the program information therein, for example with a semiconductor memory, or a replaceable-type storage medium. The replaceable-type storage medium, if used, may be replaced, when appropriate, with another having a new program stored.

The input part 4 is composed of, for example, a cross pad, mouse, and/or keyboard, and the input part 4 is operated by a driver. Provided therefrom are instructions to bring the information processing part 2 to switch among operation modes, start its operation, and the like. The input part 4 is also used to input information such as a map number, starting point, any specific point to pass by, and destination.

The output part 5 is composed of, for example, a display, and/or a speaker, and conveys various types of information needed for guidance (e.g., map, vehicle's current location, searched guidance route, landmarks), and guides the vehicle by sound whenever required.

The communications part 6 has a function of communicating with a center station (not shown), or with a terminal connected to the center station for receiving information therefrom. The main operation of the communications part 6 is to acquire landmark information.

The cartographic data storage part 7 is implemented by a large-capacity storage, and includes a recording medium such as CD-ROM or DVD, for example, and stored therein is 2D and/or 3D data used for drawing a map, which is herein called cartographic data.

The landmark information storage part 8 is a combination of a read-only storage (e.g., includes a recording medium such as CD-ROM or DVD) and a readable/writable storage (e.g., CD R/W, DVD, RAM, compact flash memory, smart media, semiconductor memory, hard disk drive). The landmark information stored in the read-only storage is initially provided, while the information in the readable/writable storage is the latest information received from the communications part 6. Additionally stored in the read-only storage are a plurality of image elements (e.g., 2D image information, polygon data, vector data) for each landmark type. Each image element is under a file name for easy search.

The position detection part 9 is composed of a global positioning system (GPS) sensor, gyro sensor, vehicle-speed pulse detector, and the like, and detects where the vehicle equipped with the navigation device 1 is currently located.

The real-time information acquisition part 10 is composed of various types of sensors, and acquires various real-time information therethrough. Here, the real-time information is a variable parameter including the vehicle's current location, speed, date, day of the week, time, gas level, weather, temperature, and the like. Herein, the real-time information is presumably limited to the gas level and time, and used to determine the display state of landmarks.

Figure 2:
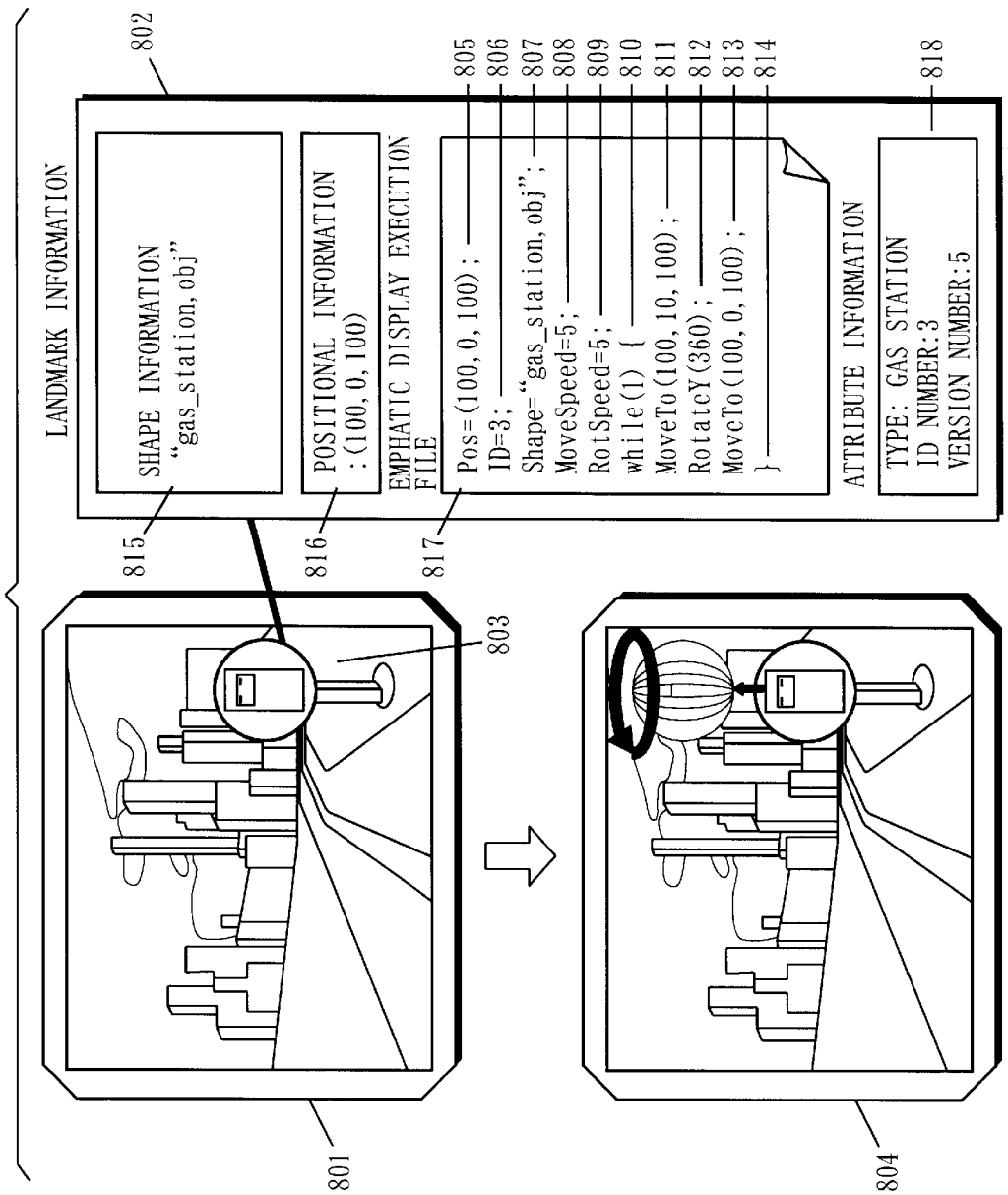
FIG. 2 is a diagram showing an example of landmark information used in the navigation device of FIG. 1, and with such landmark information, displayed on a display screen is a landmark either in the normal state or in the emphatic state.

FIG. 2 shows an example of landmark information, and exemplary display screens each with a landmark processed by the information processing part 2. Specifically, in FIG. 2, display screens 801 and 804 are outputted from the output part 5, and the former has a landmark 803 displayed in the normal state (hereinafter, such display state of the landmark is referred to as normal display), and the landmark 803 in the latter is in the specific state to attract the driver's attention (hereinafter, such display state of the landmark is referred to as emphatic display). Further, a reference numeral 802 denotes landmark information needed to display the landmark 803, and includes shape information 815, positional information 816, an emphatic display execution file 817, and attribute information 818.

The shape information 815 is used to specify which image element is applicable to the landmark to be displayed. In this example, specified is an image file of "gas_station. obj" in the landmark information storage part 9. This is not restrictive, and the landmark information may itself carry image data therein. The positional information 816 is used to define the landmark by display position, and exemplarily represented by 3D coordinates. The shape information 815 and positional information 816 are referred to for normal display.

The emphatic display execution file 817 is file information used to define the landmark by shape, display position, and movement for emphatic display. The emphatic display execution file 817 may be in the data format or program language interpretable by the information processing part 2. If applied JAVA or JAVA Script thereto, the landmarks can be animated or displayed with sound, whereby the landmarks can be presented in various manners. Here, in FIG. 2, the emphatic display execution file 817 is in the specific form of text data described in the simplified program language. This is surely not restrictive, and the emphatic display execution file 817 may be converted into the format of any specific intermediate language or virtual machine's instructions in advance, and then included in the landmark information for the information processing part 2 to interpret.

As shown in FIG. 2, the emphatic display execution file 817 exemplarily includes a group of instructions 805 to 814. Those instructions 805 to 814 are sequentially interpreted and executed by the information processing part 2 for emphatic display.

Each of the instructions 805 to 814 in the emphatic display execution file 817 is described in more detail. The instruction 805 indicates the initial position for the landmark to be displayed. The instruction 806 indicates the landmark type. The landmark 807 specifies a specific image element used to display the landmark. In this example, although specified is the image file "gas_station. obj" in the landmark information storage part 9, the landmark information may itself carry image data therein. The instructions 808 and 809 specify the movement speed and rotation speed of the landmark 803, respectively. With the instruction 810, the instructions 811 to 814 are repeated. The instruction 811 moves the landmark 803 from the current position to a position represented by coordinates (100, 10, 100). Here, the movement speed of the landmark has been specified by the instruction 808. The instruction 812 brings the landmark 803 to rotate 360 degrees on the Y axis. The instruction 813 moves the landmark 803 from the current position to a position represented by coordinates (100, 10, 100). The movement speed of the landmark at this time has been specified by the instruction 808. With those instructions 811 to 813 sequentially executed, the landmark 803 is, as shown in the display screen 804 of FIG. 2, animated to jump, spin once, and then land. By repeating such continuous movement, the landmark 803 is emphatically displayed.

The attribute information 818 is used to specify the landmarks by attribute. In this embodiment, the attribute information 818 includes, for example, type information, ID number, and version number. The type information indicates the landmark type, and used for a determination between normal display and emphatic display. The ID number is uniquely provided to the respective landmark information, and used to discriminate landmarks from one another. The version number indicates the update version of the landmark information.

In this embodiment, the landmark information stored in the landmark information storage 8 is updated to be the latest when appropriate. The landmark information is updated (1) whenever there is a request for reading the landmark information, (2) at time of route search, and if this is the case, any landmark information about landmarks on the found guidance route is collectively updated for use, (3) on a regular basis (at predetermined time or distance intervals), and in this case, the landmark information to be updated is only for a target area, and (4) under the combination of those manners (1) to (3) as appropriate.

Figure 3:
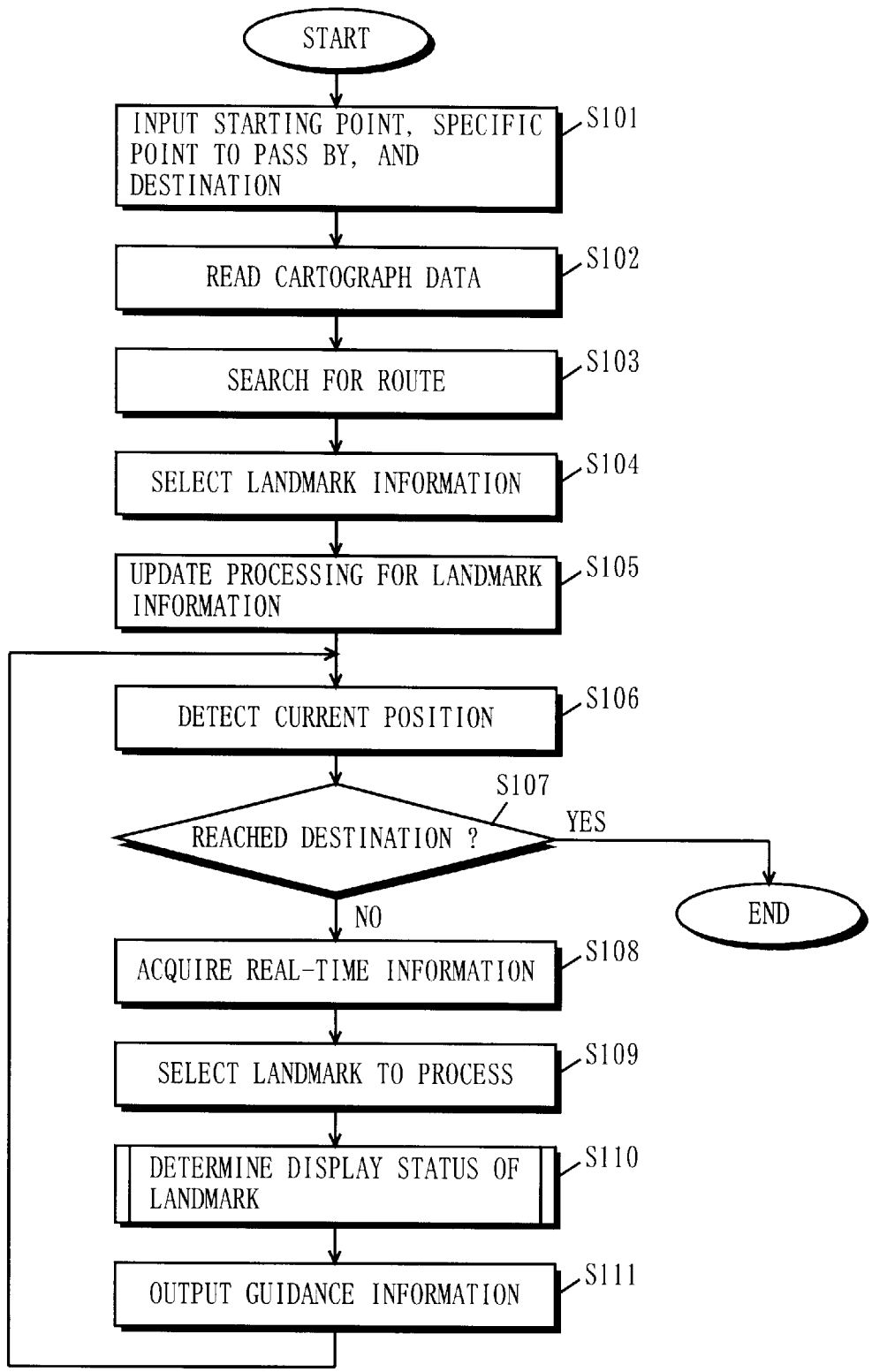
FIG. 3 is a flowchart showing the operation of the navigation device of FIG. 1.

Described next is the operation of the navigation device 1 of FIG. 1 by referring to FIG. 3 for a flowchart.

First, the input part 4 provides the information processing part 2 with the starting point, a specific point to pass by, and a destination (step S101), all of which are set by the driver. The information processing part 2 then reads, from the cartographic data storage part 7, cartographic data needed for route search between the starting point and the destination (step S102). Based on the read cartographic data, the information processing part 2 searches for an applicable guidance route between those two points (if any specific point is specified to pass by, route search is made in consideration thereof) (step S103). Note that, route search is made under the Dijkstra algorithm, for example, which is well known. The information processing part 2 then selects landmarks for route guidance to the destination (step S104). Specifically, in step S104, the information processing part 2 reads, from the landmark information storage 8, the attribute information 818 for each of the landmarks to be displayed during the route guidance.

The information processing part 2 then executes update processing to the landmark information about the landmarks selected in step S104 (step S105). Specifically, the information processing part 2 outputs the attribute information 818 read in step S104 to the communications part 6 together with an instruction to confirm whether the landmark information has been updated. In response, the communications part 6 establishes a communications path between a center station (not shown) to transmit ID numbers and version numbers found in the received attribute information. The center station then searches for any corresponding landmark information among those stored in itself based on the received ID numbers. Then, the center station compares whether the found landmark information and the landmark information from the communication part 6 are identical in version number. If identical, the landmark information in the navigation device 1 is the latest, and there is no need for an update. Accordingly, the center station transmits a notification that no update is required to the communication part 6 of the navigation device 1. The notification is then outputted from the communications part 6 to the information processing part 2. In response, the information processing part 2 does not update the landmark information. If the version numbers are not identical, the center station transmits the landmark information stored in itself to the communications part 6 as the latest landmark information. From the communications part 6, the landmark information goes to the information processing part 2 and then the landmark information storage part 8, and is stored therein as the latest landmark information. Such update processing is sequentially carried out on every landmark information selected in step S104.

The information processing part 2 reads the vehicle's current location detected by the position detection part 9 (step S106) to see whether the vehicle has reached the destination (step S107). If not yet, the information processing part 2 acquires various real-time information from the real-time information acquisition part 10 (step S108). As already mentioned, the real-time information in this embodiment is the gas level and time.

The information processing part 2 selects a landmark to process first (step S109). To be more specific, selected herein is one among those selected in step S104 (i.e., those found on the searched guidance route) which is currently closest to the vehicle in the direction of travel. Note that, the landmark selected in this step may be the closest landmark, but several landmarks ahead.

Then, the information processing part 2 refers to the real-time information from the real-time information acquisition part 10 to determine the display state of the landmark (step S110). See FIG. 4 for the details of the subroutine step S110.

Figure 4:
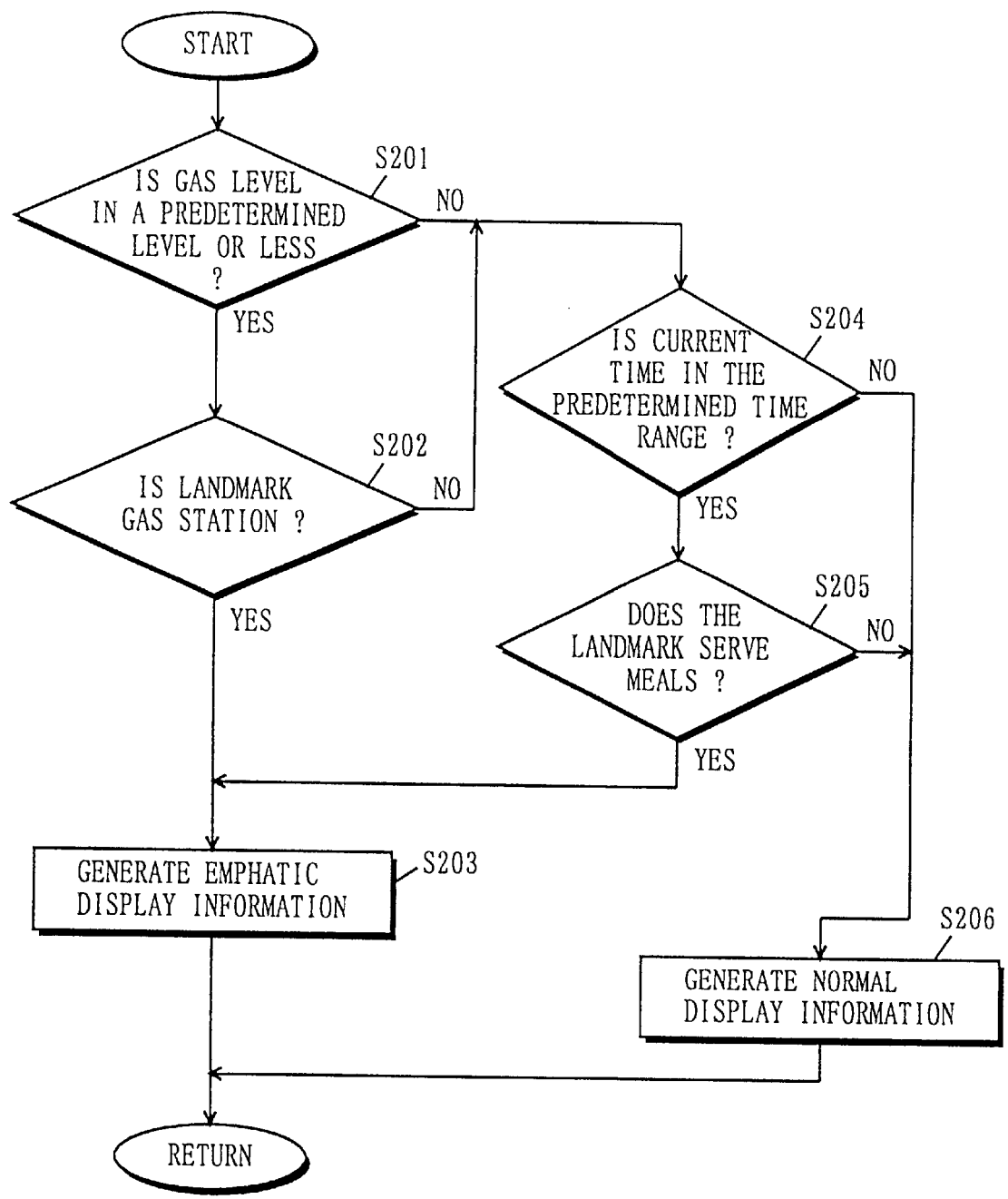
FIG. 4 is a flowchart showing, in detail, a subroutine step S110 in FIG. 3.

Referring to FIG. 4, the information processing part 2 determines whether the gas level indicated by the real-time information is equal to or lower than a predetermined level (step S201). If equal to or lower, the information processing part 2 determines whether the landmark type is a gas station (step S202). This determination is based on the type information in the attribute information 818. If the landmark type is the gas station, the information processing part 2 generates emphatic display information about the landmark (step S203). The information processing part 2 also executes the emphatic display execution file 817 in the landmark information. To be specific, following the instruction 805 in the emphatic display execution file 817, the information processing part 2 initially defines the landmark by display position, and then following the instructions 806 and 807, reads any corresponding image data (e.g., 2D image data, polygon data, vector data) from the landmark information storage part 8. The information processing part 2 then executes the instructions 808 to 814, thereby generating moving image data to animate the landmark on the display. The moving image data is temporarily stored in the information processing part 2.

In step S201, if the gas level is determined as exceeding the predetermined level, or if the landmark to process is not a gas station, the information processing part 2 determines whether now is the time in a predetermined time range, which is specifically set for the mealtime (e.g., 12:00 to 13:00, and 18:00 to 19:00) (step S204). If yes, the information processing part 2 determines whether the landmark is a facility that serves meals (step S205). Such facility includes a restaurant, cafeteria, cafe, rest area, and the like. This determination is made by referring to the type information in the attribute information 818. If the landmark is such facility, the information processing part 2 generates emphatic display information about the landmark (step S203).

If determined now is not the time in the predetermined time range in step S204, or if determined the landmark is not such facility in step S205, the information processing part 2 generates normal display information about the landmark (step S206) At this time, the information processing part 2 refers to the shape information 815 in the landmark information 802 to read any corresponding image data (e.g., 2D image data, polygon data, vector data) from the landmark information storage part 8. The information processing part 2 also defines the landmark by display position by referring to the positional information 816 in the landmark information 802. Thus read image data and defined display position are both temporarily stored in the information processing part 2. After step S203 or S206, the procedure returns to the main routine in FIG. 3.

Referring to FIG. 3 again, the information processing part 2 executes output processing for the guidance information (step S111). In this output processing, the information processing part 2 brings the output part 5 to display the map, route, and landmarks. Here, if the landmarks are to be emphatically displayed, the information processing part 2 outputs, to the output part 5, the emphatic display information (moving image data) generated in step S203. If normally displayed, on the other hand, outputted to the output part 5 is the normal display information (display position and image data) generated in step S206. Depending on thus received information, the output part 5 displays the landmarks in the emphatic or normal status. Thereafter, the procedure repeats steps S106 to S111 until the vehicle reaches the destination, and this is the end of the operation of the information processing part 2.

Note that, in this embodiment, the real-time information is the gas level and time, but surely any other information will do to change the landmark type to be displayed. For example, with weather, the landmark to be selected may be a shop where umbrellas are available, or with date, the landmark to be displayed on birthdays may be a shop where flowers are available.

Further, the landmark type is the discrimination factor for emphatic display in the embodiment, and this is not restrictive. For example, if the landmark is preferably emphatically displayed on a specific day such as New Year's Day and Christmas Eve, the attribute information 818 may previously include such information as specifying those days. The same is applicable to a specific time, and included in the attribute information 818 in this case is information specifying such specific time.

In order to implement such alternatives, the display state determination routine in FIG. 4, must be made to deal with such changes, but those would be obvious for the one having ordinary skill in the art.

Still further, in the above embodiment, for emphatic display, the landmark is exemplarily animated. This is surely not restrictive, and the landmark may be flashed or displayed with some messages. In another manner, the landmark may be displayed with sound.

Still further, the navigation device here is presumably equipped in a vehicle. This is surely not restrictive, and the navigation device may be any type as far as displaying a guidance route on a map, and may be carried by a stroller, for example.

While the invention has been described in detail, the foregoing description is in all aspects illustrative and not restrictive. It is understood that numerous other modifications and variations can be devised without departing from the scope of the invention.

What is claimed is:

1. A navigation device displaying landmarks together with a guidance route on a map, said device comprising:
    a cartographic data storage part for storing cartographic data;

a landmark information storage part for storing landmark information;

an output part for at least outputting, for display, information needed for guidance;

an input part for receiving positional information needed at least for route search;

a route search part for searching for the guidance route on said cartographic data in response to said positional information from said input part;

a display state determination part for determining, as to each of the landmarks on the guidance route found by said route search part, between normal display and emphatic display; and a display control part for bringing said output part to display the map based on the cartographic data read from said cartographic data storage part, to display said found guidance route on said displayed map, and to appropriately place and display the landmarks on said displayed map, wherein said display control part determines between normal display and emphatic display for each of the landmarks depending on a determination made by said display state determination part.

2. The navigation device according to claim 1, wherein said landmark information includes display information about the landmarks for emphatic display in the format of an execution file, and said display control part interprets and executes said execution file to bring said output part to emphatically display the landmarks.

3. The navigation device according to claim 2, wherein, in the execution file included in said landmark information, a group of instructions are described to animate the landmarks.

4. The navigation device according to claim 1, wherein said landmark information includes attribute information which defines the landmarks by attribute, and said display state determination part comprises:

a real-time information acquisition part for acquiring real-time information as a variable parameter; and a determination part for determining between normal display and emphatic display based on the real-time information acquired by said real-time information acquisition part and the attribute information stored in said landmark information.

5. The navigation device according to claim 4, wherein said attribute information includes type information indicating each of the landmarks by type, and said determination part determines between normal display and emphatic display based on the real-time information acquired by said real-time information acquisition part and the type information in said attribute information.

6. The navigation device according to claim 1, further comprising:

a landmark information acquisition part for acquiring a latest landmark information coming from outside through communications; and an update part for bringing said landmark information storage part to store the landmark information provided by said landmark information acquisition part as the latest.

7. A navigation device displaying landmarks together with a guidance route on a map, said device comprising:

a cartographic data storage part for storing cartographic data;

a landmark information storage part for storing landmark information;

an output part for at least outputting, for display, information needed for guidance;

an input part for receiving positional information needed at least for route search;

a route search part for searching for the guidance route on the cartographic data in response to the positional information from said input part;

a display control part for controlling said output part to display the map based on the cartographic data read from the cartographic data storage part, to display the guidance route on the displayed map, and to appropriately place and display the landmarks on the displayed map;

a landmark selection part for selecting, from the landmarks displayed by the landmark information stored in said landmark information storage part, any landmark found on the guidance route, a landmark information acquisition part for acquiring, from outside through communications, latest landmark information relating to the landmark selected by said landmark selection part; and an update part for bringing said landmark information storage part to store the landmark information provided by said landmark information acquisition part as latest landmark information.

* * * * *